June 19, 1962  A. KUHLENKAMP  3,039,194
CONTROL APPARATUS FOR ANTI-AIRCRAFT GUNS OR THE LIKE
Filed Aug. 25, 1958  7 Sheets-Sheet 1
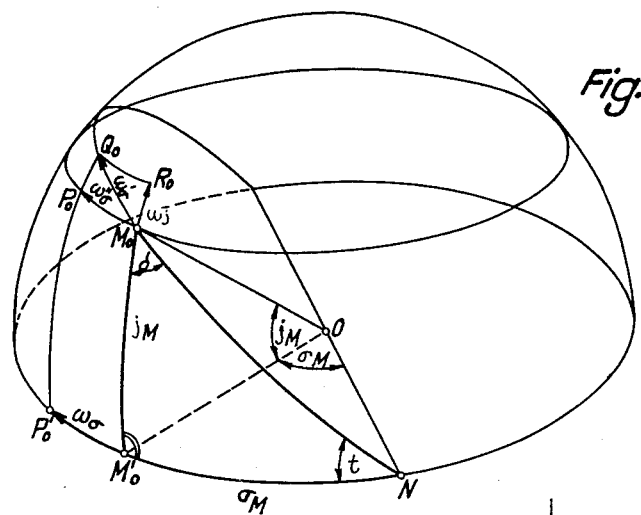
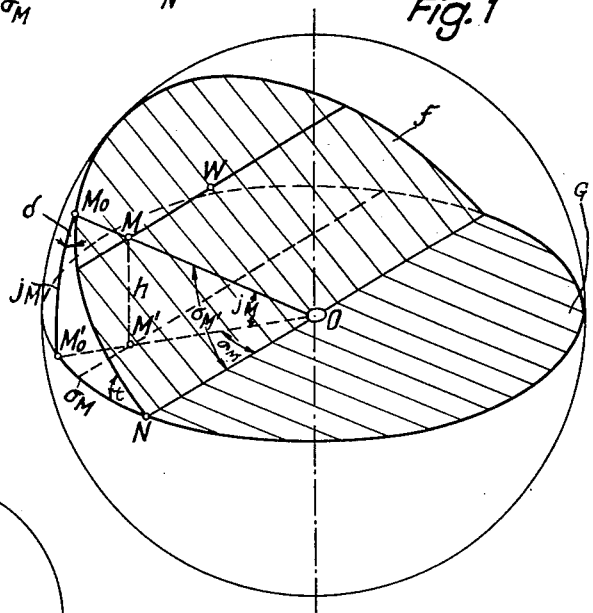
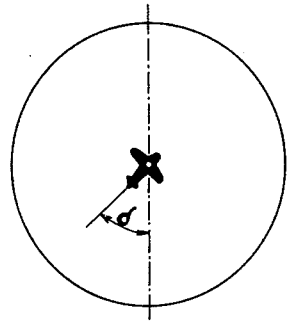
Inventor:
Alfred Kuhlenkamp

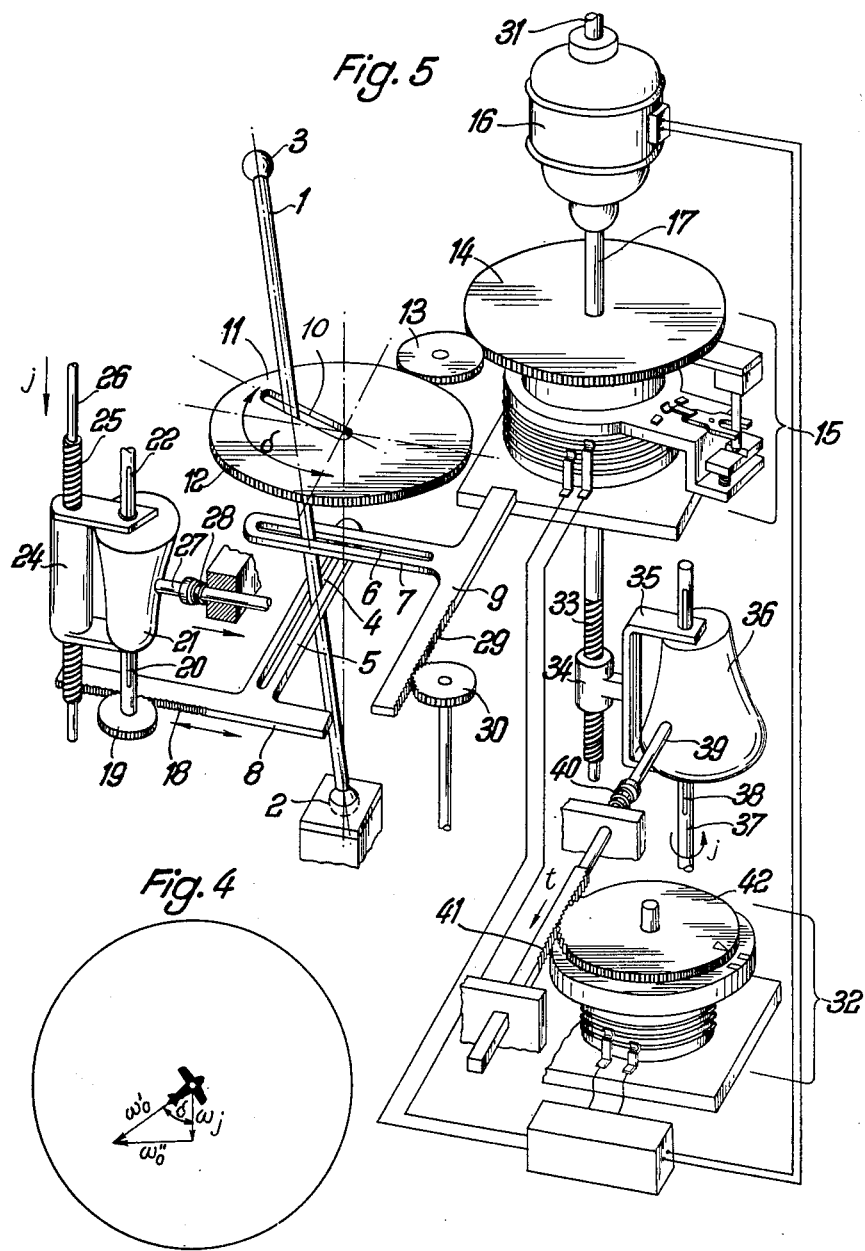

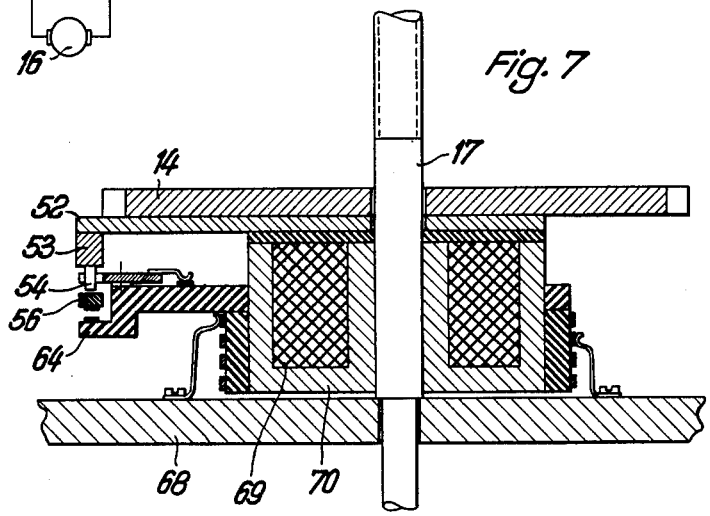

INVENTOR.
Alfred Kuhlenkamp
BY
Michael S...
Attorney

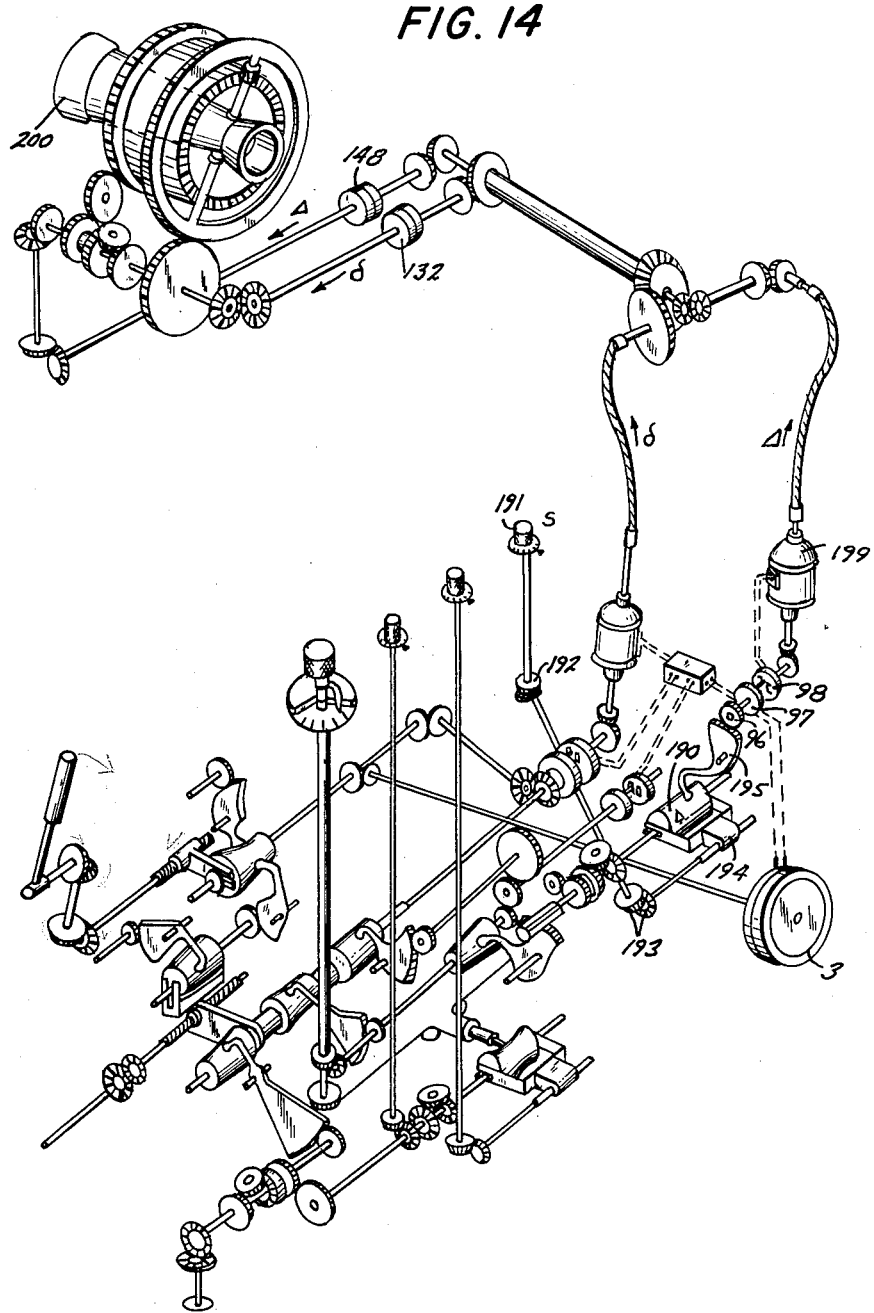

United States Patent Office 3,039,194
Patented June 19, 1962

3,039,194
CONTROL APPARATUS FOR ANTI-AIRCRAFT GUNS OR THE LIKE
Alfred Kuhlenkamp, Braunschweig, Germany, assignor to Mathema Corporation Reg. Trust, Vaduz, Liechtenstein
Filed Aug. 25, 1958, Ser. No. 758,645
Claims priority, application Germany Mar. 5, 1957
18 Claims. (Cl. 33—49)

The present invention relates to control apparatus.

More particularly, the present invention relates to control apparatus of the type used in devices such as anti-aircraft guns for controlling these devices so that they properly sight on a moving target.

A device such as an anti-aircraft gun moves simultaneously in two directions in order to remain properly sighted on a moving target. Thus, the gun moves in elevation and at the same time it moves laterally. Lateral movement takes place by turning of the gun about an axis which is vertical when the gun is mounted on horizontal ground. It is conventional to provide separate controls for the lateral and elevational movement of the gun, and these separate controls control the speed of lateral movement and the speed of elevational movement, respectively.

It has already been proposed to provide an operator of an anti-aircraft gun or the like with a single control element which is capable of controlling both the lateral and elevational movement of the gun, but these devices are not suitable for sighting the gun on targets which move at relatively high speeds. As long as the target moves at a speed of less than 600 km. per hour, such devices may be operated satisfactorily, but above this speed it is too much for the operator to control the gun efficiently. In fact, in order to enable such guns to be sighted properly on targets which move at high speeds there are arrangements whereby one operator controls the lateral movement of the gun while another operator controls the elevational movement thereof, so that two operators are required to operate the gun for tracking a high-speed target.

One of the objects of the present invention is to provide a control appaartus for a device such as an anti-aircraft gun, and this control apparatus of the invention enables a single operator to comfortably and conveniently operate the gun while sighting the gun on a target moving at high speed greater than 600 km. per hour.

Another object of the present invention is to enable the gun or the like to be controlled by the operator while the operator actuates but a single control element so that it is an extremely easy matter for the gun to be properly controlled.

An additional object of the present invention is to provide an apparatus which will perform automatically part of the sighting operation of the gun, at the will of the operator, so that part of the work conventionally required to be performed by the operator need not be performed by the operator with the present invention.

A further object of the present invention is to provide an apparatus of the above type wherein the computer structure used for the control of the gun barrel is also used for the control of the optical assembly through which the target is sighted.

Still another object of the present invention is to provide a structure capable of operating the gun and the gun sight in a manner which enables the structure to be used against targets moving along inclined as well as horizontal paths.

A still further object of the present invention is to provide a structure of the above type capable of operating the gun and the gun sight in a manner which compensates for a location of the structure in a situation where it is inclined to a horizontal plane.

It is also an object of the present invention to provide structure capable of accomplishing all of the above objects and at the same time composed of simple and ruggedly constructed elements which are very reliable in operation.

With the above objects in view, the present invention includes in a control apparatus which controls a device such as an anti-aircraft gun or the like, a manually operable means for controlling lateral and elevational movement of the gun for sighting the same on a moving target. A computer means is operatively connected with the latter manually operable means for computing and setting into the apparatus, during operation of the manually operable means, the angle of inclination of a flight plane passing through the target and the device such as the anti-aircraft gun. According to the present invention, there is a means which is operable at the will of the operator for automatically maintaining constant the computed angle of inclination of the flight plane which is set into the apparatus by the above computer means.

Also, according to the present invention, the above computer means is used for the control of the optical assembly of the device through which an image of the target is seen. Furthermore, with the structure of the invention the computer structure compensates for movement of the target along an inclined path and/or for situation of the device in a position inclined to a horizontal plane, and this computer structure controls the optical assembly so that the latter is also operated in a manner which compensates for inclined target movement and/or for an inclined positioning of the device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 illustrates schematically the geometric relationships involved in the control apparatus of the present invention;

FIG. 2 shows part of the optical apparatus in a diagrammatic manner and indicates what is observed by the operator in the optical means of the structure of the present invention;

Figure 10:
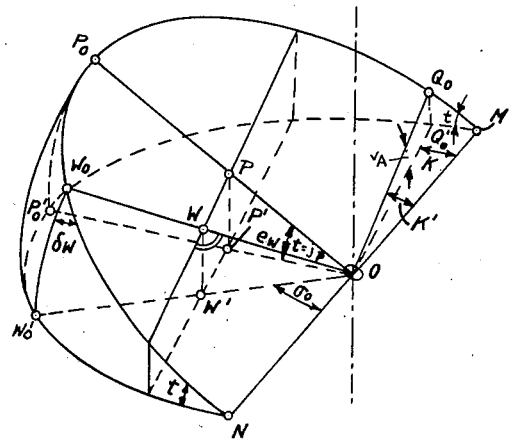
Figure 11:
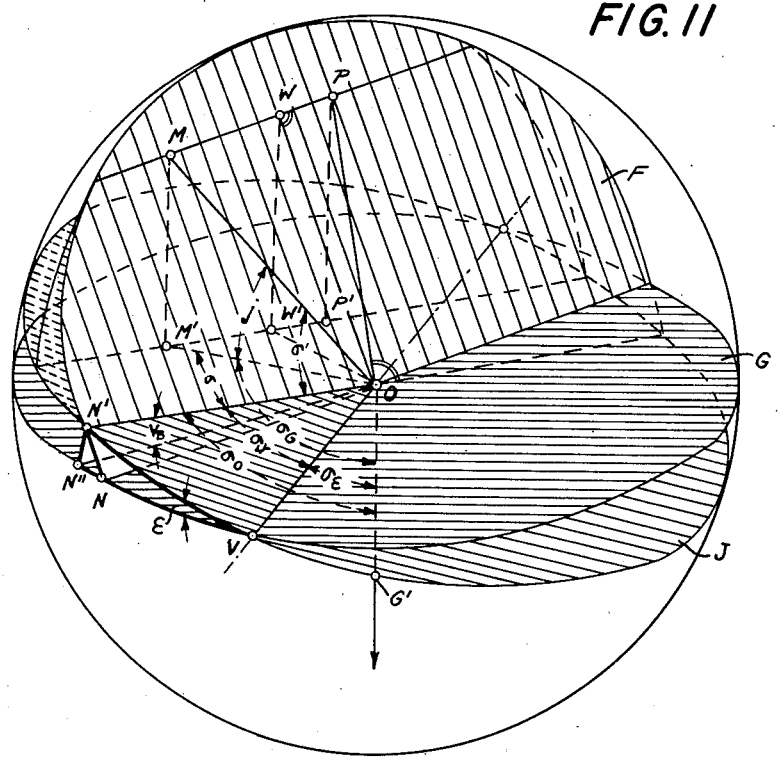
Figure 12:
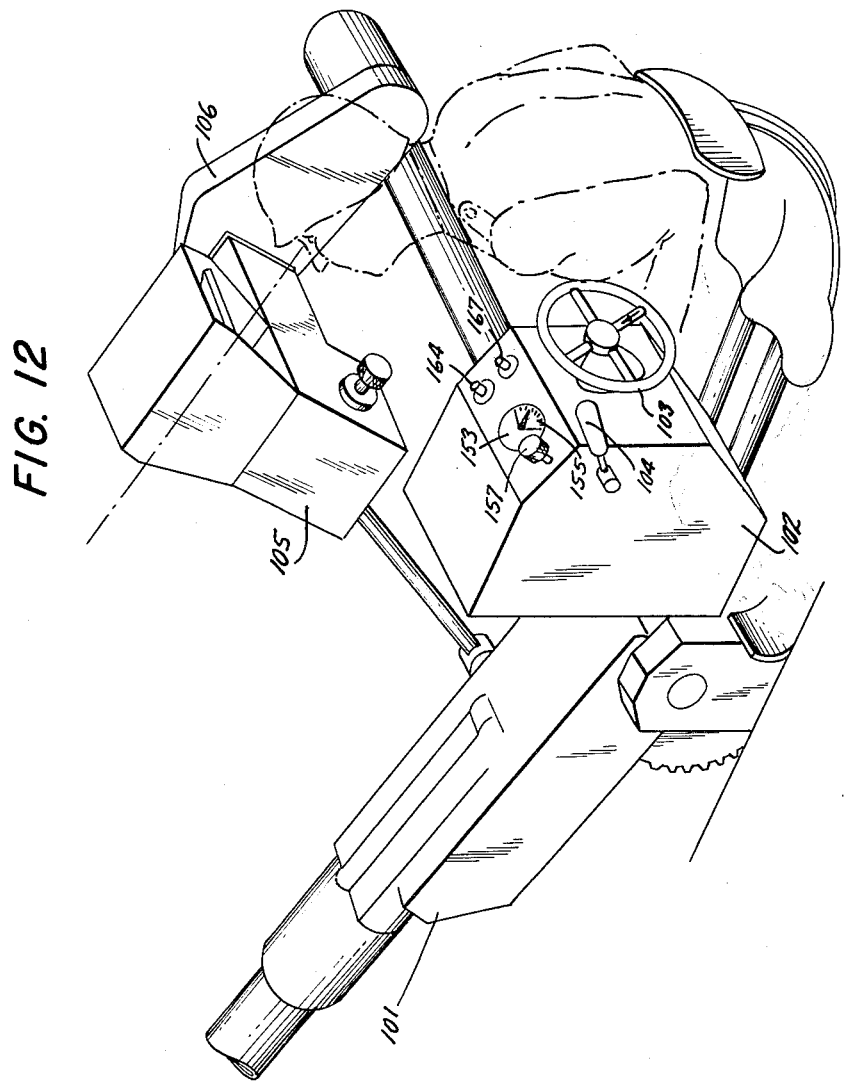
Figure 13:
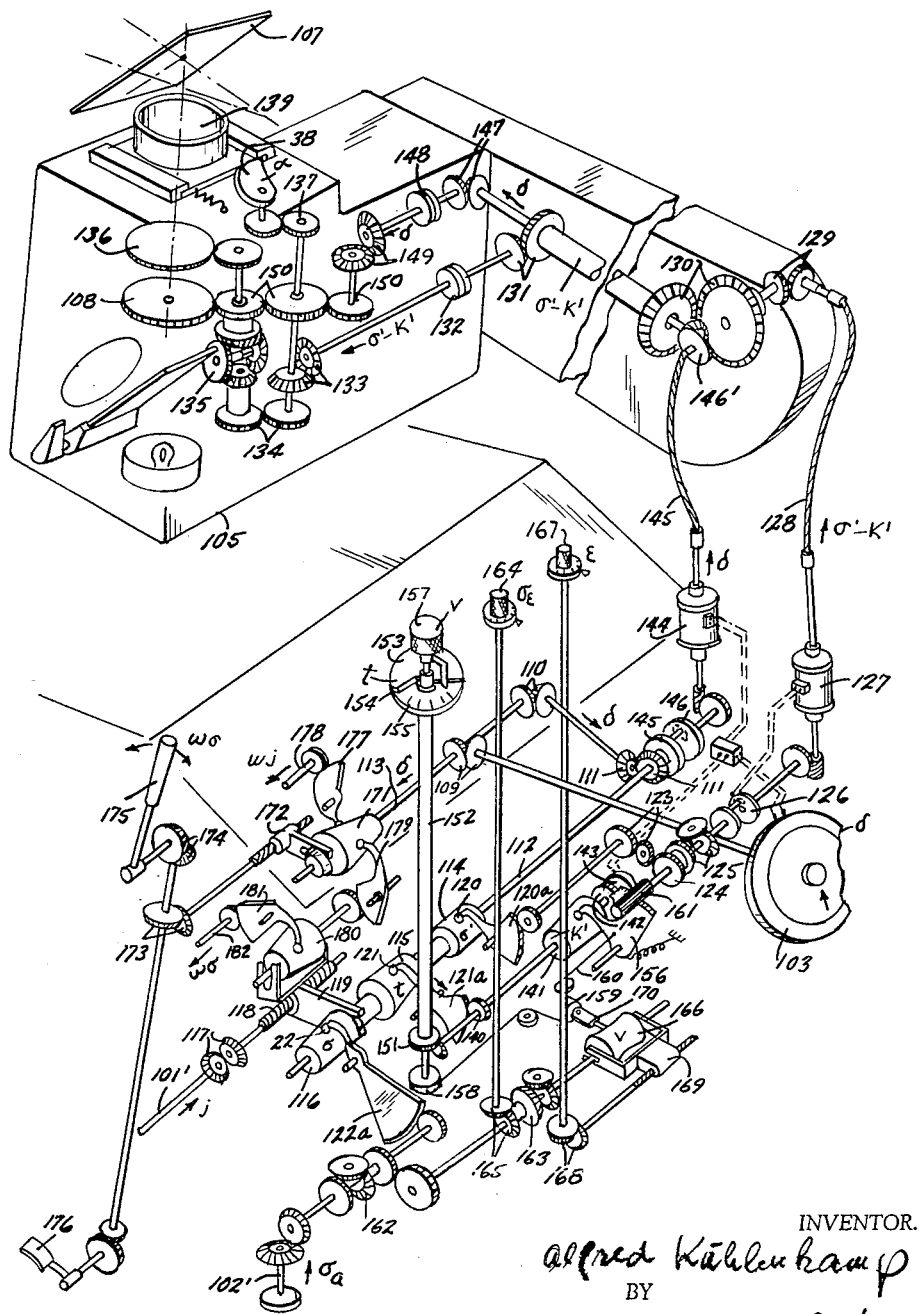

FIG. 3 diagrammatically illustrates further geometrical relationships involved in the present invention;

FIG. 4 is a view similar to FIG. 2 of part of the optical means of the present invention. FIG. 4 indicating some of the geometrical relationships involved in the apparatus of the present invention;

FIG. 5 is a fragmentary, partly schematic, perspective view of the control apparatus of the present invention, many elements such as supports, guides, and the like being omitted from FIG. 5 for the sake of clarity and in order to enable the relationship between the important elements to be very clearly illustrated;

FIG. 6 is a wiring diagram of the electrical circuit of the structure of the present invention;

FIG. 7 is a fragmentary sectional elevational view of a follower means according to the present invention;

FIG. 8 is a transverse sectional view showing part of the control sturcture of the follower means of FIG. 7;

FIG. 9 shows an additional detail of the structure of the follower means of FIG. 7;

FIG. 10 illustrates schematically the geometric relationship where the target moves along an inclined path;

FIG. 11 illustrates schematically the geometric relationships where the device of the invention is situated in a position inclined to a horizontal plane;

FIG. 12 schematically shows an operator using the device of the invention;

FIG. 13 shows a different embodiment of the structure of FIG. 5 combined with additional structure to take care of the factors illustrated in FIGS. 10 and 11, FIG. 13 also showing the structure which controls the optical assembly; and FIG. 14 illustrates how the structure of FIG. 13 is used where the optical assembly, instead of being of the reflex type shown in FIG. 13, is of the telescope type.

The geometrical principles involved in the structure of the invention are illustrated in FIG. 1. FIG. 1 shows an imaginary sphere, and the device such as the anti-aircraft gun is located at O, which represents the center of the sphere. Thus, the operator and the anti-aircraft gun or the like are located at O, and they are surrounded by the hollow transparent imaginary sphere indicated in FIG. 1. It is assumed that the target such as an aircraft is moving along a straight path which may have a constant height or which may be inclined, and the flight path of the target as well as the anti-aircraft gun are located in a common flight plane $f$ indicated in the left shaded portion of FIG. 1, this flight plane $f$ making a predetermined angle $t$ with the horizontal plane G also indicated in the shaded area of FIG. 1. The points M and W are located in the straight flight path which in the illustrated example has an elevation $h$ which is equal to MM'. The point M of the flight path appears to the operator at O to have an elevation angle $j_M$ and a lateral angle $\sigma_M$ from the zero line NO. The point M of the flight path appears to the operator on the imaginary sphere at the point $M_0$. The lateral position of the target in the horizontal plane G appears on the sphere at the point $M'_0$. Thus, there is on the surface of the sphere a right-angle triangular portion of the spherical surface $M_0M'_0N$, and in this triangular surface portion of the imaginary sphere the side $M_0M'_0$ is equal to the elevation angle $j_M$ and the arc $M'_0N$ is equal to the lateral angle $\sigma_M$. The longitudinal axis of the aircraft is, neglecting the drift angle, actually located on the flight path MW, but this axis appears to the operator at the point $M_0$ along the great circle of the flight plane $f$ which passes through the point N. In the viewing field of the telescope the aircraft appears to the observer in the manner illustrated in FIG. 2 where the angle $\delta$ indicates the inclination of the axis of the sighted aircraft to a vertical reference line indicated in dot-dash lines in FIG. 2. The angle $\delta$ indicates the apparent direction of flight of the target. This angle changes from a valve of 0 when the target is at an infinite distance from the gun to an angle of 90° when the target is at the point W in FIG. 1, which is the point where the target ceases to approach the gun and starts to move away from the gun, and this angle becomes 180° for a target moving away from the gun and located at an infinite distance therefrom. Moreover, and this fact is of great importance in the present invention, the tangent of the apparent angle of the flight path which is indicated in FIG. 2 at the same time indicates the ratio between the angular lateral speeds and the angular elevational speeds.

One possible embodiment of a structure for applying the principles of the present invention to the controls of a device such as an anti-aircraft gun is illustrated in FIG. 5, and details of this structure are illustrated in FIGS. 6–9. Referring to FIG. 5, a manually operable means is provided for controlling the lateral and elevational movement of the gun or the like, and this manually operable means includes the manually engageable member 1 which is in the form of an elongated lever. The operator engages the lever 1 adjacent its top end, as viewed in FIG. 5, and a suitable gripping knob 3 is provided at the top end of the lever 1 for this purpose, the knob 3 accommodating a push button switch 43 described below. A suitable support means supports the lever 1 for turning movement in all directions about a point located adjacent the bottom end of the lever 1, and this support means is in the form of a ball and socket joint 2 indicated in FIG. 5, so that in this way the lever 1 is supported for turning movement about this point. A disc 11 is supported for turning movement about an axis passing through the point about which the lever 1 is supported for turning movement, as is indicated in FIG. 5, and this disc 11 is further described below. It will be noted that the disc 11 is provided with a radially extending slot 10 which extends radially from the turning axis of the disc 11, and the lever 1 extends through the slot 10. Furthermore there is indicated in FIG. 5 the angle $\delta$ on the disc 11 which corresponds to the apparent angle of flight of the target, as indicated in FIG. 2. It will be noted that this angle of flight is indicated in FIG. 1 between the arcs $M_0M'_0$ and $M_0N$.

The lever 1 also passes through an elongated slot 4 formed in an elongated bar portion 5, and the lever 1 additionally passes through an elongated slot 6 formed in an elongated bar portion 7. The bar portions 5 and 7 are respectively integral with or permanently fixed to elongated bar portions 8 and 9 which respectively extend perpendicularly with respect to the bar portions 5 and 7, and by means of an unillustrated guiding structure the bar portions 8 and 9 can only move longitudinally, respectively. Thus, the bar portion 8 can only move in the direction of its length, and the bar portion 9 can only move in the direction of its length. Therefore when the lever 1 is turned so as to move along the slot 6 the bar portion 8 will be shifted, while when the lever 1 is turned so as to move along the slot 4 the bar portion 9 will be shifted.

Thus, with this structure the turning movement of the lever 1 of the manually operable means about the turning point provided by the ball and socket joint 2 will be divided into a pair of perpendicular components by the elongated bar portions 8 and 9. The longitudinal shifting of the bar portion 9 controls the angular elevational speed of the gun, while the longitudinal shifting movement of the bar portion 8 controls the lateral angular speed of movement in a horizontal plane above the horizontal plane G of FIG. 1, and the movement of the bar portion 8 longitudinally participates in controlling the lateral angular speed of movement of the gun in the horizontal plane G, as will be apparent from the description below.

It is apparent that if the disc 11 is not turned so that the lever 1 moves radially with respect to the axis of the disc 11 along the slot 10, then the movement of the bar portions 8 and 9 will have a predetermined ratio with respect to each other determined by the angular position of the slot 10. As will be apparent from the description below, under certain circumstances the operator can turn the disc 11 about its axis, while under other circumstances the angular position of the disc 11 is not determined by the operator so that at these times the operator can only move the lever 1 along the slot 10. Thus, the lever 1 has two degrees of freedom. It can move radially along the slot 10, and this is one degree of freedom, and furthermore the lever 1 can be moved so as to turn the disc 11 about its axis, and this is the second degree of freedom of the lever 1. When this second degree of freedom is eliminated, as pointed out below, then the lever 1 cannot control the angular position of the slot 10 and can only move along the slot 10, so that when this second degree of freedom is no longer under the control of the operator the operator can move the lever 1 so as to change the lateral and elevational speeds but the operator cannot control the ratio between the lateral and elevational speeds.

The disc 11 is provided with teeth 12 at its outer periphery, and these teeth mesh with an intermediate gear 13 which is supported for rotation about its axis and which meshes with another gear 14 of the same diameter as the disc 11 so that the transmission between the disc 11 and the gear 14 is at a 1 to 1 ratio. The gear 14 forms part of an electrical follower or position control means 15. This follower or position control means 15 is electrically connected with a motor 16 which has a shaft 17 extending through and beyond the follower means 15, and the shaft 17 also has an upwardly directed extension 31. The electrical follower means 15 energizes the motor 16 whenever the angular position of the gear 14 changes with respect to the angular position of the motor shaft 17, so that the angular position of the shaft 17 remains unchanged with respect to the angular position of the disc 14, and since the latter has a turning ratio of 1 to 1 with respect to the disc 11, it is clear that the angular turning of the shaft 17 takes place faithfully in the same way as the angular turning of the disc 11.

The extension 31 of the motor shaft 17 is connected with the optical means of the present invention so as to turn a part of the latter provided with the radial indicator line shown in FIG. 2 about an axis from which this indicator line radially extends. Therefore when the motor 16 causes the shaft 17 to turn, the radial line which is visible to the operator and which should coincide with the target also turns so as to change the angle $\delta$.

The downwardly extending portion of the shaft 17 which extends beyond the follower means 15 is provided with a thread 33 engaged by a sleeve 34 which shifts axially along the shaft 17 while the latter turns. This sleeve 34 is connected with a bracket 35 which engages the ends of a cam 36 whose outer surface corresponds to the angle of the flight plane $f$. The cam 36 has one or more key portions extending into the longitudinal groove 38 of the shaft 37 extending through the cam 36, so that the latter is shifted along the shaft 37 when the sleeve 34 shifts axially along the shaft 17, but on the other hand the cam 36 is compelled to turn with the shaft 37, and this shaft 37 is turned by the structure which changes the elevation of the gun through a transmission providing a constant transmission ratio between the structure which changes the elevation of the gun and the rate of turning of the shaft 37. Thus, the angular position of the cam 36 will correspond to the elevation of the gun while the axial position of the cam 36 along its own longitudinal axis, which coincides with the axis of the shaft 37, will correspond to the apparent angle of flight of the target, because, as was indicated above, the shaft 17 accurately turns so as to always have an angular position corresponding to that of the disc 11, and thus the elevation of the sleeve 34 will always correspond accurately to the apparent angle of flight $\delta$.

A feeler means cooperates with the outer surface of the cam 36, and this feeler means includes the feeler rod 39 one end of which bears against the surface of the cam 36 to be displaced by the latter in proportion to the angle $t$, as pointed out below, a spring 40 being coiled about a portion of the rod 39, pressing against a shoulder thereof, and pressing against a stationary support through which the rod 39 extends, so as to urge the rod 39 toward the cam 36. An integral extension of the rod 39 forms a rack 41, and this rack meshes with a gear 42 which forms part of a second electrical follower means 32 for controlling the motor 16. The details of the follower or position control means 15 are illustrated in FIGS. 7–9, and the follower or position control means 32 has substantially the same construction. However, as will be apparent from the description below, the operation of the position control means 32 is the reverse of position control means 15 in that the gear 14 forms the controlling element of control means 15 while the gear 42 forms the controlled element of control means 32. Referring to FIG. 7, it will be seen that the shaft 17 is supported for turning movement about its axis by a suitable bearing in a stationary support plate 68 through which the shaft 17 passes. The shaft 17 extends freely through the central opening of the gear 14 so that the latter is freely turnable with respect to the shaft 17. A plate 52 is fixed with the gear 14 and at one side extends beyond the latter, and the plate 52 carries at its portion which extends beyond the gear 14 a support 53 for a pin 54. As may be seen from FIG. 8 support 53 is formed with a bore in which the pin 54 is axially movable. A spring 55 presses the pin 54 downwardly, and this pin 54 has a bottom conical end adapted to be located in a conical recess formed in the upper face of a tiltable plate 56 carrying the electrical contacts 58 and 59 at the opposite ends of its downwardly directed face which is formed with another conical recess which receives the top conical end of a stationary pin 57 fixed to the plate 64 for movement with the latter, this plate 64 carrying the contacts 60 and 61 which are respectively located opposite the contacts 58 and 59, so that the contacts 58 and 60 engage each other when the plate 56 tilts in one direction, while the contacts 59 and 61 engage each other when the plate 56 tilts in the opposite direction. A relatively slight movement of the pin 54 to the left with respect to the pin 57, as viewed in FIG. 8, will cause the contacts 58 and 60 to engage each other, while a relatively slight movement of the pin 54 to the right, as viewed in FIG. 8, with respect to the pin 57, will cause the contacts 59 and 61 to engage each other. The electrical circuit is such that when the contacts 58 and 60 engage each other the motor 16 turns in one direction, while when the contacts 59 and 61 engage each other the motor 16 turns in the opposite direction. The shaft 17 is fixedly connected with a magnet 70 which supports the exciting coil 69, and this carrier 70 carries the plate 64 so that the latter turns with the shaft 17 at all times. When the electromagnet 69, 70 is energized by push button 43, for a purpose described below, the gear 14 will be fixed with the shaft 17 so as to be immovable with respect to the latter. However, when the electromagnet is unenergized, then the gear 14 and shaft 17 are freely turnable one with respect to the other. Thus, the electromagnet 67, 70 of the follower means forms an electrically operable means which is capable, when energized, of interconnecting the leading and follower elements of the follower means so that they are immovable with respect to each other, while when the electrically operable means 69, 70 is unenergized the follower element of the follower means is capable of following the leading element.

Thus, by referring to FIGS. 5 and 7 it will be seen that when the disc 11 is turned so as to turn the gear 14, the element 53 will turn with the gear 14 so as to cause the pin 54 (FIG. 8) to move with respect to the pin 57 in one direction or the other, and then one or the other of the sets of contacts shown in FIG. 8 will be energized so as to turn the motor 16 in that direction which will turn the shaft 17 in the direction which turns the plate 64 in a direction which follows the direction of turning of the gear 14, and in this way the follower means 15 is connected with the motor 16 so as to actuate the latter to cause the shaft 17 to always accurately have the same angular position as the disc 11, when the follower means 15 operates the motor 16.

It may happen, as when there is no electrical current, that the pin 54 will move out of the conical recess in the upper face of the plate 56, and in fact the pin 54 may move beyond the plate 56 under these circumstances. The spring 55 is fixed at one end to the pin 54 and at its opposite end to the plate 52 so as to prevent the pin 54 from falling out of the bore of the pin carrier 53. As may be seen from FIG. 9 the pin 54 is located between the bifurcations of a fork member 62 which is turnably connected by a pivot pin 63 to the plate 64 which turns together with the shaft 17. At its innermost end the fork member 62 carries an electrical contact 65, and depending upon the direction of movement of the gear 14, the pin 54 may move so as to turn the fork 62 in order to place the electrical contact 65 in engagement with one or the other of the contacts 66 and 67 carried by the plate 64, which is of an electrical insulating material. The electrical circuit is such that when the supply of electrical current is resored the engagement of the contact 65 with one or the other of the contacts 66 or 67 will turn the motor 16 so as to drive the shaft 17 in a direction which causes the plate 64 to turn so as to cause the plate 56 to approach the pin 54 which first reenters into the space between the bifurcations of the fork member 62 and then reenters the recess on the top face of the disc or plate 56. In this way the apparatus is always automatically restored to proper operating condition when the supply of electrical current is restored.

The electrical follower means 32 is of substantially the same construction as the electrical follower means illustrated in FIG. 7.

As will be apparent from the description below, the angular inclination $t$ of the flight plane $f$ is determined on the one hand by the elevation angle $j$ and on the other hand by the angle of flight $\delta$. With the structure shown in FIG. 5, when the follower means 32 operates and the shaft 37 turns in response to a change in elevation of the gun, the cam 36 moves the follower 39 so as to actuate the follower means 32 to operate the motor 16 in such a way that the sleeve 34 will shift axially and the cam 36 will shift axially to a position which will provide between the angle of apparent flight $\delta$ and the elevation angle $j$ a relationship which will maintain the angle of inclination $t$ constant. The position control means 32 responds to axial movement of the feeler or cam follower 39 and sends an impulse to the motor 16 which causes the latter to turn the shaft 17 so as to move the sleeve 34 to an elevation at which the angle of apparent flight $\delta$ corresponding to the axial position of the sleeve 34 together with the changed elevation angle $j$ will provide the same angle of inclination $t$ which was indicated by the cams before it was turned about its axis. In this way the apparent angle of flight $\delta$ is always calculated automatically by the structure of the invention once the operator permits the switch 43 to open. Thus, whenever a change in elevation of the gun is reflected by a change in the angular position of the cam 36, the elevation of the cam 36 will also change to one which will provide the constant angle $t$, and in this way the structure of the invention automatically controls the angular position of the disc 11. Therefore, when the follower means 32 is operating the apparent angle of flight $\delta$ will automatically be regulated in such a way that its relationship with the change in elevation will always maintain the angle of inclination $t$ constant. When the clutch 69, 70 is energized as described below, the turning of the shaft 17 in response to impulses received from the follower means 32 will turn the gear 14 which in turn will cause the disc 11 to turn so that the angular position of the latter is automatically controlled in this way, and thus the degree of freedom of the lever 1 which permits the disc 11 to turn about its axis is eliminated and this turning of the disc 11 is controlled automatically in the above-described manner so that at this time the operator can only move the lever along the slot 10 and while the speed of angular elevational movement and the speed of lateral movement of the gun can be changed the ratio between these speeds cannot be changed at this time.

The electrical structure for interconnecting the above-described elements is illustrated in the wiring diagram of FIG. 6. This structure includes a manually operable switch 43. This switch is part of a push-button arrangement which is located at the gripping knob 3. The push-button is not illustrated in FIG. 5 for the sake of clarity because of the relatively small scale of the gripping knob 3 in FIG. 5. While the operator may grasp the knob 3 so as to move the lever 1, he may simultaneously actuate the push-button with the same hand so as to close the switch 43, this switch moving automatically under the action of a spring, for example, to its open position when released by the operator.

The current is supplied to the electrical circuit from the lines 51. When the operator closes the switch 43 the relay 44 is energized. This relay cooperates with the switches 45 and 46 indicated in FIG. 6, and the switches 45 and 46 are shown in FIG. 6 in the position they take when the relay 44 is energized upon closing of the switch 43. The switch 47 of FIG. 6 corresponds to the switch arrangement illustrated in FIG. 8 and forms the switch control of the electrical follower means 15, while the switch 48 of FIG. 6 also corresponds to the structure shown in FIG. 8 and forms the electrical switch control structure for the electrical follower means 32. The electromagnet 49 of FIG. 6 corresponds to the electrically operable means 69, 70 indicated in FIG. 7, and the electromagnet 50 of FIG. 6 forms the electrically operable means of the follower means 32. It will be noted from FIG. 6 that when the relay 44 is energized by closing of the switch 43 the switch 47 of the electrical follower or position control means 15 is interconnected with the motor 16 while the switch 48 of the follower or position control means 32 is not connected with the motor 16. This is brought about by positioning of the switch 45 in the position illustrated in FIG. 6 by the energized relay 44. Thus, the motor 16 will turn in one direction or the other depending upon impulses received from the switch 47 of the position control means 15, in the manner described above in connection with FIGS. 7 and 8, while when the switch 43 is closed by the operator the switch 48 of the position control means 32 will be disconnected from the circuit and will have no influence on the motor 16. It will be noted that at this time the relay 44 has placed the switch 46 in a position which energizes the electromagnet 50 so that the controlling and controlled elements of the position control means 32 are immovable one with respect to the other, and thus the depression of the button 43 by the operator serves to place the position control means 32 out of operation while placing the position control means 15 in operation so that when the button is pressed by the operator to close the switch 43 the movement of the motor 16 is controlled by the position control means 15.

During turning of the position control means 15, the angular position of the slip ring carrying controlled element which is fixed to the shaft 17 is determined by the operator who manually controls the angular position of the controlling element 14 of the position control means 15. During turning of the shaft 17 the elevation of the cam 36 along its axis is adjusted and the cam follower 39 is moved along its axis to control the angular position of the position control means 32 whose controlling and controlled elements turn together at this time. Whenever the operator chooses to release switch 43 so as to change over to automatic operation, the controlling element of position control means 32, namely the slip-ring carrying element thereof, will remain in the angular position it happens to be in when the operator chooses to release the switch 43. No special structure is required to maintain the controlling element of position control means 32 in the angular position it has when the operator releases push button 43 since the friction of the slip ring carrying element in its bearing together with the friction of the springy contacts which bear against the slip rings is sufficient to prevent movement of the controlling element of position control means 32 during automatic operation.

On the other hand, when the operator releases the button at the hand grip 3, the switch 43 opens so as to de-energize the relay 44, and the result is that the switch 45 moves to place the switch 48 in connection with the motor 16, and the switch 47 is no longer connected with the motor 16, and at the same time the switch 46 moves so as to energize the electromagnet 49, and thus at this time the gear 14 cannot move with respect to the shaft 17. Also, the motor 16 is controlled only by the switch 48 which controls the direction of turning of the shaft 17.

At this time, whenever the cam 36 changes its angular position the cam follower 39 will move axially to displace the controlled element 42 with respect to the controlling element of position control means 32, this controlling element may be stationary at this time, with the result that the motor 16 will be driven to raise or lower the cam 36 to an elevation which will return the cam follower 39 to its previous axial position and the controlled element 42 to the angular position it had with respect to the stationary controlling element, and in this way the angular position of disc 11 is automatically changed to maintain the ratio between the angle of apparent flight $\delta$ and the elevation angle $j$ constant so as to maintain the angle of inclination $t$ constant.

Referring now to FIG. 3, it will be seen that at the point $M_0$ of the imaginary hollow sphere, which is the same as the sphere of FIG. 1, the point $M_0$ of FIG. 3 being the same as the point $M_0$ of FIG. 1, the angular speed in elevation changes in the direction of the meridian $M_0M'_0$ and the lateral angular speed changes in the direction $M_0P_0$, this latter are being located in a broad circle of a horizontal plane which is parallel to the horizontal plane G. The resultant of these speeds is indicated at $M_0Q_0$, and this resultant speed is located on the great circle which passes through the point N as well as the point $M_0$ and which forms the outer part of the flight plane $f$. This resultant $M_0Q_0$ makes with the meridian the angle $\delta$. Thus, the angular elevational speed $\omega_j$ is determined by $M_0R_0$, the lateral angular speed is indicated by $M_0P_0$ in the broad circular plane located above the horizontal plane G and parallel thereto, and $M_0Q_0$ indicates the lateral angular speed in the flight plane $\omega'_\sigma$. From the lateral angular speed in the horizontal plane $\omega''_\sigma$ the lateral angular speed in the horizontal plane G which includes the arc $M'_0P'_0$, which is to say the horizontal angular speed $\omega_\sigma$, can be determined according to the formula $$\omega_\sigma = \omega''_\sigma \cos j$$

Referring now back to FIG. 5, the longitudinal movement of the bar portion 8 corresponds to the lateral movement in the horizontal plane which includes the arc $M_0P_0$, and it is necessary to convert this value to the proper value $M'_0P'_0$ necessary to be used for the angular turning of the gun which is located in the horizontal plane G. The determination of the angular turning of the gun in the horizontal plane G is brought about according to the above formula, and a cam 21 is provided, the outer surface of this cam corresponding to the above formula. The longitudinal movement of the bar portion 8 is transmitted to the cam 21 so as to turn the latter about its axis, and this takes place by means of a rack 18 forming part of the bar portion 8 and meshing with a pinion 19 which is fixed to the shaft 20 which extends axially through the cam 21. This cam 21 has a key or the like extending into a longitudinal groove 22 of the shaft 20, so that in this way the cam 21 is compelled to turn with the shaft 20 and the pinion 19 while at the same time the cam 21 is axially shiftable along the shaft 20. The axial shifting of the cam 21 is controlled by a shaft 26 having a threaded portion 25 which is threadedly connected with a sleeve 24 which through a suitable bracket engages the top and bottom ends of the cam 21 so that the latter shifts axially with the sleeve 24. The shaft 26 is mechanically coupled in an unillustrated manner with the structure which changes the elevation of the gun, so that the angular position of the shaft 26 corresponds at all times to the angular position of the gun in elevation, and thus whenever the elevation of the gun is changed the shaft 26 turns so as to change the elevation of the sleeve 24 and therefore of the cam 21 along its axis. The combined axial and rotational movement of the cam 21 are received by the end of a feeler rod 27 urged by a spring 28 toward the cam 21, and inasmuch as the surface of the cam 21 corresponds to the above formula, it is apparent that the feeler rod 27 will be shifted in a manner which will cause the longitudinal shifting of the bar portion 8 to be automatically changed to a longitudinal shifting of the rod 27 which corresponds to the proper angular movement of the weapon laterally in the horizontal plane G. The rod 27 is interconnected with the structure which angularly turns the weapon in the horizontal plane so as to properly turn the weapon in the horizontal plane G in response to longitudinal movement of the bar portion 8 which corresponds to movement in the circle which includes the arc $M_0P_0$ of FIG. 3. Thus, the manually operable means of FIG. 5 is capable of automatically converting the movement of the lever 1 to control movements which properly regulate the drives which turn the gun in elevation as well as laterally.

The longitudinal movement of the bar portion 9 is converted by a rack portion 29 thereof in cooperation with a pinion 30 meshing with the rack 29 into a rotary movement of a shaft fixed to the pinion 30, as evident from FIG. 5. This rack 29 and pinion 30 are operatively connected in an unillustrated manner with the structure which changes the angular elevation of the gun, and the angular elevation of the gun or the speed of movement of the gun in angular elevation is directly determined by the position of the bar portion 9.

FIG. 4 shows the optical means illustrated in FIG. 2 with the lateral angular speed vector $\omega''_0$ and the elevational angular speed vector corresponding to those shown in FIG. 3 extending from the point $M_0$. Thus, the resultant $\omega'_0$ indicated in FIG. 4 as coinciding with the axis of the aircraft corresponds to and coincides with the radial indicating line of FIG. 2 which the operator holds in coincidence with the target. Where the above-mentioned two degrees of freedom of the lever 1 are provided, it is apparent that while the operator moves the lever 1 so as to longitudinally shift the bar portions 8 and 9, he is also setting the angle of the slot 10 with respect to the turning axis of the disc 11, and this angle $\delta$ is indicated in FIG. 4 as well as in FIG. 2. Thus, while the operator holds the push-button switch 43 in its closed position so that the follower means 15 operates, the lever 1 has two degrees of freedom and the operator controls the angular position of the disc 11 so as to also control through the follower means 15 the angular position of the shaft 17. The angular control is visible to the operator in the optical means because of the fact that the element which carries the radial indicator line of FIG. 2 is turned by the shaft 17 through connection with the extension 31 thereof, as was pointed out above. It is apparent that at this time the follower means 32 has no influence on the motor 16 and the operator is controlling the shaft 17 so as control the elevation of the cam 36, and thus at this time where the lever 1 has two degrees of freedom the operator is selecting the flight plane $f$, or in other words the operator is selecting the angle of inclination $t$ of the flight plane. The longitudinal movement of the rack 41 turns the gear 42, but the leading and following elements of the follower means 32 cannot turn with respect to each other at this time, so that the follower means 32 has no influence on the motor 16, as was described above in connection with FIG. 6.

It is apparent therefore that when the operator actuates the manually operable means made up of the lever 1 and the bar portions 8 and 9 for controlling the lateral and elevational movement of the gun, at the same time the disc 11 is cooperating with a computer structure composed of the transmission 13, 14, the follower 15, and the motor 16 which through its shaft 17 causes the sleeve 34 to move up or down, and in this way the angle of inclination of the flight plane is calculated with this computer structure at the cam 36 which will have an angular and elevational position indicative of the angle of inclination of the flight plane which is set into the apparatus by the operator. The cam position determines the position of rack 41 and gear 42, and, during the setting period, the position of the element clutched to gear 42. When the clutched element is released therefrom, its position establishes a set value of $t$, to which the cam 36 and the disc 11 are made to conform during the automatic period. Additional computer structure may be associated with the optical means of the apparatus. Thus, a computer structure for automatically calculating the lead required by the weapon to be properly aimed at the moving target may be connected with the optical apparatus of the structure. In this way it is possible with the structure of the invention to continuously calculate the point at which the gun must be aimed in order to bring down the target when the gun is fired.

Referring now to FIG. 3, it will be seen that if the lateral angular speed in the flight plane $M_0Q_0$ is known, and with the angle of direction $\delta$ known, it is possible to determine the elevational speed $M_0R_0$ and the lateral angular speeds $M_0P_0$ as well as $M'_0P'_0$. The lateral angular speed is determined simply by maintaining the sight on the target, as indicated in FIG. 4.

In order to let the operator know in which direction to turn the manually engageable member 1, it is necessary to determine the angle of apparent flight. This angle of apparent flight is indicated by the angular position of the radial indicator line of FIG. 2, as was pointed out above, and as is indicated in FIG. 4 the position of this radial indicator line is the resultant of the lateral and elevational angular speeds of movement of the target.

The present invention relies for the basis of the structure on the principle that the angle of inclination $t$ of the flight plane $f$ with respect to the horizontal plane G will remain constant throughout the entire length of a straight line path of flight of the target. Stated in other terms, the flight plane $f$ will have been correctly determined if the angle $t$ of the flight plane remains constant while the target continues to move along a straight line.

As was pointed out above this angle of inclination of the flight plane is located in the right angular triangular portion of the sperical surface of the imaginary sphere $M_0M'_0N$, and it will be noted that the angle of apparent flight $\delta$ is also included in this spherical triangle. Thus, there are between these angles and the side arcs $j_{M\sigma M}$, certain spherical relationships.

In accordance with the present invention while the operator is manipulating the manually engageable member 1 in order to sight the gun on the target the member 1 has two degrees of freedom and the operator can thus turn the disc 11 so as to control the angle of the radial indicator line of FIG. 2, and the operator moves the lever 1 so as to place the radial indicator line in coincidence with the target in the viewing field of the telescope as soon as possible. The operator knows that the radial indicator line must coincide with the target, and in this way the operator places the disc 11 in a predetermined angular position. In addition, as long as the target moves along a straight path the calculated angle of inclination $t$ of the flight plane $f$ will remain constant as pointed out above. Thus, when both of these requirements are fulfilled, which is to say that the radial indicator line in the telescope coincides with the image of the target and the angle $t$ remains constant, the device is operating properly. From the calculated angle of inclination $t$ of the flight plane $f$, which is computed by the computer structure of the invention, which was pointed out above, and from the elevation angle $j$ known by following the target through manipulation of the lever 1, it is possible to calculate in a reverse manner the angle of apparent flight $\delta$. In other words, the operator at the beginning will control the tuning of the disc 11 and will control the angle of apparent flight which appears in the telescope. However once the angle of inclination $t$ of the flight plane $f$ has been determined, then from this latter angle as well as from the angle of elevation of the gun it is possible to calculate with the structure of the invention the angle of apparent flight, so that once the proper angle of inclination of the flight plane has been determined by the structure it is unnecessary for the operator to continue to hold the radial indicator line of FIG. 2 on the target, and the structure of the invention automatically holds this line on the target as long as the target moves along a straight path, assuming that in the original instance the angle $t$ has been properly established in the computer. In this way the structure of the invention eliminates the necessity for the operator to determine the angle of apparent flight $\delta$ after the angle of inclination $t$ has been determined. As is apparent from FIG. 4, the angle of apparent flight $\delta$ determines the ratio between the lateral and elevational movements of the target, so that the angular position of the slot 10 of the disc 11 will control the ratio between the movements of the bar portions 8 and 9, and thus this latter determination is carried out in a completely automatic manner with the structure of the invention so that the operator can easily follow a fast-moving target.

Thus, at the beginning the operator will have two degrees of freedom at the lever 1 and will control the angular position of the disc 11 until the computer structure calculates the angle $t$, and once this angle is calculated by the structure of the invention, then at the will of the operator he no longer controls the angular position of the disc 11, and instead this angular position is determined automatically by the structure of FIG. 5 which calculates the proper angle of apparent flight from the constant angle $t$ as well as from the angle of elevation $j$.

The moment when the control of the angular position of the disc 11 will be taken over by the automatic structure of the invention is completely controlled by the operator. In other words, at the will of the operator the operator may control the angular position of the disc 11 or he may follow the angular position of the disc 11, as well as the angular position of the radial indicator line in the viewing field of the telescope, to be controlled by the machine. The change-over from manual to automatic control of the angular position of the disc 11 is brought about by operation of the push-button switch 43 described above. Thus, the operator when he first sights the gun on a target holds the switch 43 closed and once the radial indicator line in the viewing field coincides with the apparent path of movement of the target and remains in this position the operator knows that the proper angle $t$ has been calculated by the structure of the invention, and he then permits the switch 43 to open, and at this moment from the constant angle $t$ as well as changes in the elevation of the gun the angular position of the disc 11 will be automatically controlled, so that from this moment on the operator has only one degree of freedom at the lever 1 and can control the lateral and elevational movement of the target but cannot control the ratio between these movements, so that it is a simple matter for the operator to properly control the gun even with a very high-speed target. The slot 10 of the disc 11 acts as a straight edge and guides the lever 1 for radial movement toward and away from the turning axis of the disc 11 which passes through the point about which the lever 1 is supported for turning movement, and the angular position of this straight edge formed by the slot 10 is continuously controlled in a fully automatic manner by the calculating structure of the invention. The continuous automatic changing of the angular position of the slot 10 corresponds to the unchanged straight line path of movement of the target in space.

Referring now to FIGS. 5 and 6, when the operator first sights the gun on a target he closes the switch 43 so that at this time the disc 14 is freely turnable with respect to the shaft 17 and thus the operator can very quickly and easily turn the disc 11 so as to bring the radial indicator line in coincidence with the target. At this time the follower 15 operates so as to cause the drive shaft 17 to have an angular position corresponding to that of disc 11, and in this way the elevation of the sleeve 34 as well as of the cam 36 is controlled. The angular position of the cam 36 accurately reflects the angle of elevation of the gun, as was pointed out above, and the surface of the cam 36 is made according to the formula $$\cos t = \sin \delta \cos j$$

so that the radius of the point of the surface of the cam 36 which is engaged by the feeler 39 indicates the angle of inclination $t$ which is calculated by the computer structure of the invention. At the moment when the operator permits the switch 43 to open, the electromagnet 49, which corresponds to the electrically operable means 69, 70 of FIG. 7, becomes energized so as to lock the disc 14 to the shaft 17 and thus the follower means no longer operates and the disc 11 is compelled to have the same position as the shaft 17, but in this case through the locking of the transmission from the disc 11 to the shaft 17. Thus, upon release of the push-button on the gripping knob 3, the relay 44 becomes unenergized so as to cause the position control means 32 to come into operation, and at this time the motor 16 is controlled by the switch 48 of FIG. 6 which has the construction indicated in FIG. 8, so that the controlled element 42 of the position control means 32 has its position accurately determined by the position controlling element of this position control means, this position controlling element being stationary at this time.

Assuming now that the angle of inclination $t$ indicated by the cam 36 changes. Thus, once the operator permits the switch 43 to open, a change in elevation will cause the cam 36 to turn about its axis so that the rod 39 will be shifted longitudinally. The follower 32 immediately responds to the axial movement of the feeler 39 and sends an impulse to the motor 16 which causes the latter to turn the shaft 17 so as to move the sleeve 34 to an elevation at which the angle of apparent flight $\delta$ corresponding to the axial position of the sleeve 34 together with the changed elevation angle $j$ will provide the same angle of inclination $t$ which was indicated by the cam before it was turned about its axis. In this way the apparent angle of flight $\delta$ is always calculated automatically by the structure of the invention once the operator permits the switch 43 to open. Thus, whenever a change in elevation of the gun is reflected by a change in the angular position of the cam 36, the elevation of the cam 36 will also change to one which will provide the constant angle $t$, and in this way the structure of the invention automatically controls the angular position of the disc 11.

As was pointed out above, it is evident from FIGS. 1 and 3 that the angle of inclination $t$ of the flight plane $f$ remains constant during the entire horizontal flight of the target, and the same is true if the target moves along an inclined straight path in the flight plane $f$. However, when the aircraft moves up or down in the flight plane the geometric relationships differ from those indicated in FIGS. 1 and 3, and these geometric relationships for a target moving along a path inclined with respect to a horizontal plane are illustrated by way of example in FIG. 10. Thus, as may be seen from FIG. 10 the aircraft no longer moves along a straight line parallel to the reference line NO and instead moves along a straight line which makes an angle with the line NO. The point W on the flight path at which the target is nearest to the location O of the gun is spaced in FIG. 10 from the point P where the angle of elevation is at a maximum in such a way that the point W is located at a part of the flight path which is at an elevation lower than point P. In the flight plane of FIG. 10 the distances from points along the flight path to the point O where the gun is, are symmetrically arranged with respect to the point W in the same way as when the flight path is horizontal. Thus, the lead angle can be calculated in the same way from the lateral angle of the gun barrel in the flight plane as when the flight path is horizontal. On the other hand, the relationship between the apparent angle of flight $\delta$ and the lead angle changes when the flight path is inclined. When the flight path is horizontal, the apparent angle of flight $\delta$ is a right angle when the target is at the point W. However, in the example of FIG. 10 the apparent angle of flight $\delta$ becomes a right angle when the target has reached the point P after having moved beyond the point W. Thus, the apparent angle of flight is displaced with respect to the lead angle when the flight path is not horizontal, and displacement is such that the flight angle $\delta$ is 90° when the aircraft moves upwardly after the aircraft passes through and beyond the point W while this angle is 90° before the aircraft reaches the point W when the aircraft moves downwardly along an inclined straight path. This displacement can be compensated by a correction of the lateral angle in the horizontal plane, as will now be demonstrated with respect to FIG. 10.

This correction angle K (FIG. 10) is calculated from the angular relationships of the spherical right triangle $Q_0MQ'_0$ shown at the right end of FIG. 10, this triangle being derived from a straight line extending through O in the flight plane parallel to the flight path, this line being shown at $OQ_0$ in FIG. 10. In this triangle the arc $Q_0Q'_0$ is equal to the angle of inclination $v_A$ of the flight path. From this triangle it is apparent that:

$$\sin K = \operatorname{ctg} t \cdot \operatorname{tg} v_A$$

It is therefore apparent that the angle $v_A$ can only have a maximum value equal to the angle $t$, and in this case the correction angle K is 90°. The direction of flight is then directly toward the gun at point O. The angle of inclination $t$ of the flight plane is therefore also the limit value for the angle $v_A$.

The displacement of the point W from the point P where the angle of elevation $j$ is a maximum and equal to the flight plane angle $t$, results in a change of the lead angle Δ (FIG. 14), which depends upon the distance between the target and point W, this lead angle being determined with respect to the radial indicator line of FIG. 2 which indicates the apparent angle of flight $\delta$. When the target flies along a horizontal path the lead angle values are those which apply to a target having a flight angle $\delta$ of 90° at the point W nearest to the gun, while when the target is climbing the lead angle values will be those for a target having a flight angle of less than 90° at the point W and when the target is descending the lead angle values are those for a target having a flight angle $\delta$ greater than 90° at the point W. The change is determined by the angle K′ (FIG. 10), which is equal in FIG. 10 not only to the arc $Q_0M$ but also to the arc $W_0P_0$. From the spherical relationships in the above-mentioned right triangle $Q_0MQ'_0$:

$$\sin K' = \sin v_A / \sin t$$

Therefore, the correction angle K′ can be calculated from the angle $v_A$ (which can be measured, for example) and the flight plane angle $t$.

The geometric basis for the operation of the optical system of the gun must be changed as soon as the gun is not in the horizontal plane G (FIG. 1) because, for example, the gun is self-propelling and situated on the side of a hill so that the gun base cannot be adjusted to a horizontal position. The geometric relations which obtain in this event are illustrated in FIG. 11. The gun turns in the plane J of FIG. 11 which is inclined with respect to a horizontal plane G. The magnitude and direction of the inclination of the plane J with respect to a horizontal plane is determined by the direction of the axis OV about which the tilting takes place and by the angle between the planes G and J. Assuming that the line OG′ is the zero or reference line from which the lateral angle of the gun in the tilted plane J is measured, this line OG′ being, for example, the longitudinal axis of the vehicle which carries the gun, then the position of the tilt axis OV is determined by the lateral angle $\sigma\epsilon$. The angle of tilt between the planes G and J is given by the angle $\epsilon$ between these planes at the point V. The direction and magnitude of inclination of the plane J can be determined by a spirit level which is first turned in the direction providing the greatest displacement from the horizontal and which is then returned to the horizontal position.

The horizontal flight path MWP of the target indicated in FIG. 11 is located in a flight plane F which intersects the horizontal plane G along the line NO which is parallel to the flight path. This flight plane intersects the tilted weapon plane J along the line N"O which is not parallel to the flight path and instead will intersect the flight path at a finite distance in the same way that an inclined flight path as indicated in FIG. 10 would intersect a horizontal flight path. The position of the reference line N'O in the weapon plane J is determined by the lateral angle $\sigma_0$ measured from the zero line OG'. The point N" in the horizontal plane is derived by spherical projection of the point N' onto the horizontal plane, and in this way the spherical right triangle VN"N' is derived, in which the arc N'N" is equal to the angle of inclination $v_B$ of the flight path with respect to the plane J produced by the inclination $\epsilon$ of the plane J. Thus, this inclination of the weapon plane J can be taken care of in the same way as an inclined flight path, as discussed above in connection with FIG. 10, where the angle $v_A$ is the actual angle of inclination. The arc VN" is equal to the angle $\sigma_V$ which is equal to $\sigma_0-\sigma_\epsilon$. From the right angle triangle VN'N":

$$\sin v_B = \sin \sigma_V . \sin \epsilon$$

On most anti-aircraft weapons an optical system of the reflex type, as indicated diagrammatically at the upper left of FIG. 13, is used. However, weapons of large caliber require a telescope providing the magnification necessary to detect and follow a target located too far away to be seen with the naked eye, and such a telescopic optical means is shown diagrammatically in FIG. 14. Such a telescope, used instead of a reflex optical means, must be so mounted that it can turn about one axis in proportion to the angle of flight $\delta$ and about a second axis in proportion to the lead angle $\Delta$. For this purpose an additional computer drive is required to determine the lead angle $\Delta$ from the lateral weapon angle $\sigma^1$ and the speed of the target. Otherwise the weapon with the telescope is the same as the weapon with the reflex optical means.

As is diagrammatically indicated in FIG. 12 the carriage of the gun 101 fixedly carries in an unillustrated manner an enclosure 102 in which the control structure is located. This control structure includes a manually operable means made up in part of a hand wheel 103 and a lever 175 located at the exterior of the box 102 so that they are accessible to the operator. The entire device requires operation of only the parts 103 and 175 by the operator, and the hand wheel 103 is driven automatically at times, as pointed out below. All other operations are produced automatically. These manually operable elements provide on the one hand the starting value from which the motor drives for the lateral and elevational movement of the gun are continuously controlled and on the other hand the value from which displacement of the optical means with respect to the gun 101 by the lead angle value is determined and transmitted to the optical means 105. These values are transmitted as angular shaft movements from the box 102 along the optical means carrier 106 to the optical means 105 carried thereby.

The hand wheel 103 is supported for rotary movement by a shaft with respect to which the hand wheel 103 has a slight play, and this shaft and the hand wheel are respectively provided with electrical contacts which engage each other after the hand wheel has been turned by the operator through its slight play so as to transmit its turning movement to the shaft. The engagement of these contacts operates electrically to change the controls from automatic to manual operation.

Also located at the exterior of the control box 102 are the control knobs 157, 164, and 167 for adjusting different angular values, as pointed out below in connection with FIG. 13, and the indicators 153 and 155 which provide an indication of the operation of the controls and the optical means.

The entire control structure for the gun as well as the optical means is shown in an exploded schematic view in FIG. 13 where the hand wheel 103 is visible as well as the lever 175. The lateral drive of the gun locates the gun at the angle $\sigma_G$ indicated in FIG. 11, and the shaft 102' shown at the bottom of FIG. 13 is angularly turned by this lateral drive so that the angular turning of shaft 102' is indicative of the angle $\sigma_G$ and serves to introduce this angle into the control structure formed by the combination of the manually operable means and computer means illustrated in FIG. 13. The drive which changes the angle of elevation of the gun so as to provide the elevation angle $j$ also drives the shaft 101' which is thus indicative by its rotary movement of the angle of elevation $j$, so that this angle is introduced into the control structure by the shaft 101'. The operator observes the image of the target on the ground glass 107 and adjusts by turning the hand wheel 103 the angular position of the radial line indicator 108 an image of which is also seen at infinity on the glass 107, this indicator line being the same as that of FIG. 2. The operator turns the hand wheel 103 until the radial indicator line coincides with the apparent direction of movement of the target. As was pointed out above, the angular position of this radial indicator line shows the apparent angle of flight $\delta$, and therefore the angular position of the hand wheel 103 is also indicative of the angle of flight and thus serves to introduce the angle of flight $\delta$ into the controls. The manner in which the rotation of hand wheel 103 is transmitted to the optical means for positioning the radial indicator line is described below.

The rotary movement of the hand wheel 103 is transmitted through the bevel gears 109, 110, and 111 to the disc 145 of a follower means which may have the same construction as the above-described electrical followers 15 and 32. The pair of bevel gears 109 also serve to rotate the shaft 113. The shaft 112 extends parallel to the shaft 113 and one of the bevel gears 111 as well as the disc 145 fixed thereto are freely turnable with respect to the shaft 112 which extends coaxially through the disc 145 and the bevel gear fixed thereto. The disc 146 which cooperates with the disc 145 is, however, fixed to the shaft 112 for rotation therewith. As is apparent from the above description of the follower means made in connection with FIGS. 7 and 8, the follower motor 144 will be controlled by the relative positions of the contacts carried by the discs 145 and 146 in such a way that through the worm and worm wheel drive illustrated in FIG. 13 the motor 144 will rotate the shaft 112 so that the disc 146 follows the rotary movement of disc 145. Therefore, the motor 144 turns according to the flight angle $\delta$ set into the controls by the hand wheel 103 and this motor 144 transmits the flight angle to the shaft 112 and also through the flexible drive shaft 145' to the bevel gears 146' and from the latter to the bevel gears 147 and through the clutch 148 and bevel gears 149 to the gear train 150 which directly serves to control the angular position of the radial indicator line perceived by the operator.

The shaft 112 carries a group of cam bodies 114, 115, and 116 which are connected together and arranged one after the other on the shaft 112 coaxially therewith, these cam bodies being slidably keyed to the shaft 112 so that they are constrained to rotate therewith while at the same time being free to shift axially therealong. These cam bodies have outer surfaces of a configuration conforming to a formula which gives values resulting from the mathematical relationship of two variables. The axial position of the cam bodies corresponds to one of the variables and the angular position thereof corresponds to the other of the variables so that the angular and axial positions of the cam body may be used for computing values as pointed out below. It is apparent from the above description that the angular position of the shaft 112 is indicative of the flight angle Δ and therefore the cam bodies 114–116 are set in an angular position according to the particular flight angle introduced by hand wheel 103, and the flight angle therefore forms one of the variables of the cam bodies 114–116.

As was mentioned above the particular angle of elevation $j$ of the gun barrel is set into the controls through the shaft 101'. The rotary movement of this shaft is transmitted through the bevel gears 117 to a screw 118 threadedly connected with the shifting fork 119 which serves to shift the group of cam bodies 114–116 axially along the shaft 112 to an axial position corresponding to the particular elevation angle $j$ of the gun. Thus, this elevation angle forms the second variable of the cam bodies. From the geometric relations discussed above in connection with FIGS. 1–3 and 10 and 11, it is apparent that from the flight angle Δ and elevation angle $j$ it is possible to calculate the lateral angle $\sigma'$ of the gun in the flight plane measured from the gun plane J, the angle of inclination of the flight plane, and the lateral angle $\sigma$ in the gun plane. Thus, the cam body 114 gives the angle $\sigma'$, the cam body 115 gives the angle $t$, and the cam body 116 gives the angle $\sigma$, which are respectively the lateral angle in the flight plane, the angle of inclination of the flight plane, and the lateral angle in the gun plane, this latter angle being measured from the line of intersection between the flight plane and the gun plane.

Several cam followers respectively engage the surfaces of the cam bodies 114–116 for transmitting these angular values therefrom into the rest of the computer means. Thus, the follower 120 cooperates with the cam body 114 for transmitting the angle $\sigma'$ through the gear sector 120a to a gear train 123, 124 which serves to introduce the angle $\sigma'$ into the differential 125. In a manner described below the correction angle K' referred to above in connection with FIG. 10 is also introduced into the differential 125 when the flight path is not horizontal, and the differential 125 serves to calculate the difference between these angles, and thus the value $\sigma'-K'$ is transmitted from the differential 125 to the disc of an electrical follower means, as described above in connection with FIGS. 7 and 8, to control the follower motor 127. Thus, the follower means 126 controls the motor 127 so that one of the discs of the follower means faithfully follows the disc turned by the differential 125, and in this way motor 127 rotates according to the value $\sigma'-K'$ which is transmitted from the motor 127 through the flexible drive shaft 128 to the bevel gears 129 and 130. The bevel gears 130 drive a tubular shaft through which freely extends the shaft interconnecting the bevel gears 146' and 147. This tubular shaft transmits the drive from the gears 130 to the bevel gears 131 which through the clutch 132 drive the bevel gears 133 which in turn operate the differential 135 through the gears 134. The differential 135 is operatively connected with the optical element 136 of known construction for turning the latter with respect to the radial indicator line 108 therebelow according to the value $\sigma'-K'$ so as to displace the radial indicator line according to the lead angle, element 136 having curves 136a which give the lead angle from the value $\sigma'-K'$. The bevel gears 133 also serve to transmit through the gears 137 the value $\sigma'-K'$ to the cam 38 which serves to shift the objective 139 of the optical system perpendicularly to its optical axis to automatically introduce the superelevation angle α, the cam 138 having a configuration which converts the angular turning of the cam to a shifting of the objective which is proportional to the superelevation angle.

The cam follower 121 cooperates with the cam 115 so as to transfer the angle of inclination $t$ of the flight plane through the gear sector drive 121a to the gear 140 fixed to a shaft which carries the cam body 141 so that the latter turns according to the angle $t$.

In addition, the shaft fixed to the gear 140 and carrying the cam 141 operates an electrical follower means which includes the disc 142 which turns with the gear 140 and the follower disc 143 driven by the motor 144 so as to faithfully follow the discs 142. Thus, in the structure of FIG. 13 is included another embodiment of the structure shown in FIG. 5. The electrical followers 145, 146 and 142, 143 respectively correspond to and may have the same construction as the followers 15 and 32, and these follower devices of FIG. 13 cooperate with the motor 144 the same way that the devices 15 and 32 cooperate with the motor 16. As long as the hand wheel 103 is operated manually the discs 142 and 143 are magnetically locked to each other and only the discs 145 and 146 operate the motor. However when the operator wishes to release the device to automatic operation he actuates a switch located at the hand wheel 103, as a result of the play between the hand wheel and its shaft as described above, which serves to lock the discs 145 and 146 to each other and to release the motor 144 to automatic control by the follower means 142, 143. In this way the structure of FIG. 13 will automatically control the angle δ so as to maintain the angle of inclination $t$ of the flight plane constant, as was described above in connection with FIGS. 1–6, the cam body 115 corresponding to the cam 36. When thus set for automatic operation the job of the operator is considerably simplified since the hand wheel 103 is automatically turned and the drive from the motor 144 to the optical means 105 takes place automatically for maintaining the radial line 108 in coincidence with the target image as long as the target flies along a straight line.

The follower 121 and gear drive 121a, 140 also serve to transmit the angle $t$ to the bevel gear drive 151 which thus causes the hollow shaft 152 to turn in proportion to the angle $t$. A disc 153 of an indicator, as referred to above in connection with FIG. 12, is fixed to the hollow shaft 152 for turning movement therewith, and this disc 153 is located over and turns with respect to a stationary scale 155 carried by the box 102 at the exterior surface thereof, the shaft 152 extending through the wall of the box 102 and coaxially through the scale disc 155. This disc 153 is formed with a sector-shaped cutout through which the scale 155 is visible, and an edge 154 of the cutout of disc 153 serves as an index for reading on the scale 155 the particular angle of inclination $t$ of the flight plane.

As was mentioned above, the correction angle K' is introduced into the differential 125 to be subtracted from the angle $\sigma'$. The cam body 141 gives the angle K' since it is constructed according to the formula for K' modified as indicated above to take account of both $v_A$ and $v_B$:

$$\sin K' = \sin (v_A + v_B)/\sin t$$

The variable $t$ is introduced into the cam body by regulating the angular position thereof from the cam body 115 in the manner described above through the drive 121a, 140. While the other variable $(v_A + v_B)$ could be introduced by axial shifting of the cam body 141, in the particular example illustrated the same result is achieved by axially shifting the cam follower with respect to the cam body. The angle $v_A$ of the flight path is determined from measurements taken by the operator with a spirit level, for example, by placing the spirit level on a surface of the gun which is horizontal when the gun is on horizontal ground, and this angle is manually introduced by turning the knob 157 which is fixed on the one hand to a pointer cooperating with the scale 155 and on the other hand to a shaft extending coaxially through the hollow shaft 152 and fixedly connected at its bottom end to a pulley 158 fixed to one end of a cable. The other end of this cable is fixed to the cam follower 156, and the cable 160 passes around the pulleys of a pulley differential 159 before reaching the follower 156. Thus, angular turning of the knob 157 by the operator to an angular position corresponding to the angle $\nu_A$ will serve to axially shift the follower 156 to a position corresponding to this angle. A sector gear turns with the follower 156 and cooperates with an elongated gear 161 which is operatively connected to an intermediate gear carrier of the differential 125 so that through this structure the correction angle $K'$ is introduced in the differential to be subtracted therein from the angle $\sigma$.

As was mentioned above the cam body 116 gives lateral angle $\sigma$ (FIG. 11) in the horizontal plane measured from the line of intersection between the flight plane and the horizontal plane. This value is transferred from the cam body 116 through the gear sector drive 122a into a differential 162 which also receives the angle $\sigma_G$ from the shaft 102'. This differential serves to subtract the angle $\sigma$ from the angle $\sigma_G$, and this value is transmitted through the gearing shown at the bottom of FIG. 13 to a second differential 163. Of course, the drive 122a includes a shaft extending freely through the gear shown to the right of the differential 162 in FIG. 13, so that this drive is introduced into the differential 162 and does not interfere with the transmission of the value $\sigma_G - \sigma$ to the differential 163. From this latter value the angle $\sigma_\epsilon$ is subtracted in the differential 163 which regulates the angular position of the cam body 166. This cam body 166 is constructed according to the formula above $$\sin \nu_B = \sin \sigma_V \sin \epsilon$$

As may be seen from FIG. 11 the angle $\sigma_V$ is equal to $\sigma_G - \sigma - \sigma_\epsilon$. Thus, the latter subtractions are successively carried out in the differentials 162 and 163 to set the cam 166 at an angular position corresponding to the angle $\sigma_V$. The angle $\sigma_\epsilon$ is manually introduced into the differential 163 by turning of the knob 164. A suitable scale turns with the knob and cooperates with a stationary index on the box 102 so that the bevel gears 165 are turned in proportion to the angle $\sigma_\epsilon$ which is thus introduced into the differential 163. As was pointed out above, the angle $\sigma_\epsilon$ can be determined by the operation of a spirit level which serves to find the direction of tilt of the gun base.

The cam 166 is shifted to an axial position according to the variable $\epsilon$, and this is accomplished by manual turning of the knob 167 which also causes a scale to turn with respect to a stationary index on the box 102. This knob 167 drives through the bevel gears 168 a screw threadedly connected to a shifting fork 169 which axially shifts the cam 166. In this way the cam 166 transmits the angle $\nu_B$, resulting from location of a weapon in a plane J inclined to the horizontal plane G, to the cam follower 170 connected with a pulley of the pulley differential 159 so as to axially shift the follower 156 according to an angle $\nu_B$ occasioned by positioning of the weapon in an inclined plane. It is apparent that the pulley differential 159, 160 makes it possible for the angle $(\nu_A + \nu_B)$ resulting either from an inclined flight path or from an inclined position of the weapon to be introduced into the computer for making the necessary corrections, and this pulley differential also enables the total angle $(\nu_A + \nu_B)$ to be simultaneously introduced via knob 157 and via cam 166 to take care of the situation where the aircraft flies along an inclined path and at the same time the weapon is positioned on an incline, and the construction of the pulley differential combines the angles $(\nu_A + \nu_B)$ introduced in this way in such a way that only the necessary resultant of these angles acts to determine the axial position $K'$ of the cam follower 156. For example, if it should happen that an inclined flight path were exactly compensated by an inclined position of the weapon, then the values introduced through the knob 157 and the cam 166 would exactly cancel each other and the cam follower 156 would not move.

The above-described combined manually operable means and computer means shown in FIG. 13 serves not only to control the optical means 105 but also to control the lateral and elevation drives of the gun. For this purpose, the shaft 113 which turns when the hand wheel 103 is manually turned or which turns automatically when the hand wheel 103 is automatically turned carries a cam body 171 which is slidably keyed to the shaft 113 so as to be axially shiftable with respect to the same while constrained to rotate therewith. Thus, the angular position of the cam 171 is in proportion to the flight angle $\delta$ whether the latter is manually introduced or automatically maintained. The axial position of the cam 171 is determined by a shifting fork 172 threadedly connected with a screw rotated by the bevel gears 173. These bevel gears may be optionally turned by the operator by actuation of the pedal 176 or by manual turning of the lever 175. The lever 175 drives the bevel gears 173 through the bevel gears 174. The axial position of the cam 171 is proportional to the angular speed $\omega_\sigma'$ in the flight plane (FIG. 3). Thus, the lever 175 or foot pedal 176 are available to the operator for introducing this value into the control structure, and the lever 175 (or foot pedal 176) is the only element which the operator is required to control during the entire operation. The operator locates the lever 175 in a position which will maintain the intersection of a selected one of curves 136a with the radial indicator line in coincidence with the moving target. These curves 136a correspond to different lead angles, and the operator will select one of these curves in accordance with the particular lead angle. The shape of the cam 171 is such that it delivers to the followers 177 and 179 the components of the speed $\omega_\sigma'$. Thus, the follower 177 will be actuated by the cam 171 according to the angular speed of elevation $\omega_j$, and the follower 179 will be actuated by the cam 171 according to the lateral angular speed $\omega_\sigma''$. These geometric relations are particularly apparent from FIG. 4 which clearly shows how these components can be trigonometrically derived from the angular speed $\omega_\sigma'$ and the flight angle $\delta$. The follower 177 feeds the angular speed $\omega_j$ to the elevation drive through the shaft 178, while the lateral speed $\omega_\sigma''$ is transmitted from the cam follower 179 to the cam 180 whose angular position is thus regulated according to the angular speed $\omega_\sigma''$. As is apparent from FIG. 3 this angular speed must be projected on the base plane to derive the angular speed $\omega_\sigma$. The cam 180 is axially shifted by a shifting fork threadedly connected to the screw 118 which is turned according to the angle of elevation $j$ introduced through the shaft 101'. Thus, the configuration of the cam 180 is such that it gives the angular speed $\omega_\sigma$ in the horizontal plane from the angular speed $\omega_\sigma''$ and the elevation angle $j$, and this angular speed $\omega_\sigma$ is transmitted by the cam follower 181 and the shaft 182 to the lateral drive. It is thus apparent that the cam 171 corresponds to the slotted bars 5 and 7 of FIG. 5 and the lever 175 performs the same function as the lever 1 when the latter is shifted along the radial slot 10.

Of course, the control of the elevation drive by the shaft 178 is fed back into the control structure through the shaft 101', and the control of the lateral drive by the shaft 182 is fed back into the control structure by the shaft 102'. If the lever 175 (or pedal 176) is improperly positioned by the operator the result will be that through the shaft 101' the cam 115 will be axially positioned in such a way that the angle $\delta$ maintained by the apparatus to give a constant angle $t$ will not position the radial indicator line on the target and the operator then knows that he must change the position of the lever 175.

As was pointed out above, where the target is at a considerable distance from the weapon it is necessary to use a telescope rather than a reflex optical means, and FIG. 14 shows such an arrangement.

As may be seen from FIG. 14, the structure is the same as that of FIG. 13 except that instead of an electrical follower means 126, the embodiment of FIG. 14 includes cam 190 which is angularly positioned by the differential 125 according to the value σ'—K'. A shifting fork 194 cooperates with the cam 190 for axially positioning the same according to the speeds of the target. An additional knob 191 is available to the operator for axially shifting the cam 190 according to the speed of the target through the bevel gear drives 192 and 193. The operator simply turns the knob 191 until the sight and the target remain in coincidence, and in this way the cam 190 is axially shifted to a position determined by the speed of the target. The configuration of the cam 190 is such that it gives the lead angle Δ from the speed of the target and the value σ'—K' so that this cam 190 functions similar to the lead adjusting cam element 138 referred to above. The lead angle is transmitted by the cam follower 195 and gear 196 to an electrical follower means 197, 198 which causes the motor 199 to be driven in such a way that it turns the disc 198 so that it faithfully follows the disc 197. The lead angle is then transmitted from the motor 199 to the telescope 200 with a drive similar to that which cooperates with the motor 127. Thus, the flight angle δ is transmitted into the optical means through the clutch 132 of FIG. 14 and the lead angle through the clutch 148. These drives serve in a known way to turn the telescope 200 about its longitudinal axis according to the flight angle δ and about an axis crosswise of the direction of movement of the target and perpendicular to the longitudinal axis of the telescope according to the lead angle Δ.

The optical means forms a separate subassembly, and the clutches 132 and 148 serve to connect the drives of the optical means to the transmission means which extends along the carrier 106 (FIG. 12).

It is apparent from the above discussion that the computer structure of FIG. 13 deals with various angles none of which ever exceed 360°. In fact, these angles are often quite small. Since it is necessary to transmit the angular relationships from the computer through the electric motors to the optical means, it is apparent that where the angles are relatively small even a slight play in the flexible shafts 128 and 145, for example, would give a false transmission which could be substantial when compared to a small angular value which is transmitted. This problem is avoided by arranging the motors so that they transmit to the optical means multiples of the angular values of the computer means which are several times the size of the actual angular values of the computer means. Then the drives in the optical means step the transmission ratio back down according to an inverse of the step up transmission ratio between the computer means and the motors, so that in this way the transmissions of the optical means return the multiples of the angular values of the computer means back to their original value, and in this way any slight play in the flexible transmission is of purely negligible significance.

It is apparent that if the target moved only along a horizontal path and the weapon were always situated in a horizontal plane, only the computing means formed by the cam body 115, the electrical follower means 142, 143 and the parts associated therewith would be necessary, and in fact such a computer means is shown in FIG. 5 and in FIG. 13 with respect to those elements which correspond to the elements of FIG. 5. Therefore, the cam bodies 114 and 116 and all of the parts associated therewith such as the cam body 141, various differentials, and the motor 127 form an additional computer means for computing the lateral angles from which the above-mentioned corrections are derived.

This application is a continuation-in-part of my abandoned copending application Serial No. 700,852 filed December 5, 1957 and entitled "Control Apparatus for Anti-Aircraft Guns or the Like."

It will be understood that each of the elements described above, or two or more together, may also find a useful application in other types of control apparatus differing from the types described above.

While the invention has been illustrated and described as embodied in control apparatus for anti-aircraft guns and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a control apparatus for controlling a device such as an anti-aircraft gun or the like, in combination, manually operable means for controlling lateral and elevational movement of the device to sight the same on a moving target; computer means operatively connected with said manually operable means for automatically computing and setting into the apparatus, during operation of said manually operable means, the angular inclination of a flight plane passing through the target and the device; and means operable at the will of the operator for applying to said manually operable means controls derived from said computer means for automatically maintaining constant, during manipulation of said manually operable means by the operator, the computed angular inclination of the flight plane which is in the apparatus.

2. In a control apparatus for controlling a device such as an anti-aircraft gun or the like, in combination, manually operable means for controlling lateral and elevational movement of the device to sight the same on a moving target, said manually operable means including a manually engageable member capable of being moved by the operator and having two degrees of freedom; computer means for automatically computing and setting into the apparatus, during operation of said manually operable means, the angular inclination of a flight plane passing through the target and the device; and means operable at the will of the operator for automatically maintaining constant the computed angular inclination of the flight plane which is in the apparatus, said means for maintaining said angle of inclination constant comprising means for eliminating one of said degrees of freedom from said manually engageable member during operation of said means for automatically maintaining said angle constant.

3. In a control apparatus for controlling a device such as an anti-aircraft gun or the like, in combination, manually operable means for controlling lateral and elevational movement of the device to sight the same on a moving target, said manually operable means including a manually engageable member having two degrees of freedom, the movment of said manually engageable member in one of said degrees of freedom changing both the speed of lateral movement and the speed of elevational movement of the device and the movement of said manually engageable member in the other of said degrees of freedom changing the ratio between the speed of lateral movement and the speed of elevational movement of the device; computer means operatively connected with said manually operable means for automatically computing and setting into the apparatus, during operation of said manually operable means, the angular inclination of a flight plane passing through the target and the device; and automatic means operable at the will of the operator for automatically maintaining constant the computed angle of inclination of said flight plane which is set into the apparatus, said automatic means when it is operating eliminating said other degree of freedom from said manually engageable member so that during operation of said automatic means said manually engageable member may be operated to change the speed of lateral movement and the speed of elevational movement of the device while the ratio between the latter speeds is maintained constant.

4. In a control apparatus for controlling a device such as an anti-aircraft gun or the like, in combination, manually operable means for controlling lateral and elevational movement of the device to sight the same on a moving target; computer means operatively connected with said manually operable means for automatically computing and setting into the apparatus, during operation of said manually operable means, the angular inclination of a flight plane passing through the target and the device; means operable at the will of the operator for automatically maintaining constant the computed angular inclination of the flight plane which is in the apparatus; and optical means through which the target is visible to the operator, said optical means including a turnable member turnable about a predetermined axis and having an indicator line visible to the operator and extending radially from said axis, said manually operable means being operatively connected with said optical means for turning said turnable member about said axis, the coincidence of said indicator line with the target during operation of said means for automatically maintaining said angle constant indicating to the operator that the proper angular inclination of the flight plane has been set into the apparatus.

5. In a control apparatus for controlling a device such as an anti-aircraft gun or the like, in combination, manually operable means for controlling lateral and elevational movement of the device to sight the same on a moving target; computer means operatively connected with said manually operable means for automatically computing and setting into the apparatus, during operation of said manually operable means, the angular inclination of a flight plane passing through the target and the device; means operable at the will of the operator for applying to said manually operable means controls derived from said computer means for automatically maintaining constant, during manipulation of said manually operable means by the operator, the computed angular inclination of the flight plane which is in the apparatus; optical means through which the target is visible to the operator, said optical means including a turnable member turnable about a predetermined axis and having an indicator line visible to the operator and extending radially from said axis, said manually operable means being operatively connected with said optical means for turning said turnable member about said axis, the coincidence of said indicator line with the target during operation of said means for automatically maintaining said angle constant indicating to the operator that the proper angular inclination of the flight plane has been set into the apparatus; and additional computer means operatively connected with said optical means and with said manually operable means for computing the lead angle required for properly aiming the device at the instant of firing, said lead angle being continuously computed by said additional computer means.

6. In a control apparatus as recited in claim 1, said manually operable means includng a lever adapted to be engaged and moved by the operator and supported for turning movement about a predetermined point, a disc turnable about an axis passing through said point and formed with a radial slot through which said lever extends, and said means for automatically maintaining said angle of inclination constant including a pair of electrical position control means interconnected with each other and operatively connected with said disc for automatically turning the latter about said axis.

7. In a control apparatus as recited in claim 1, a pair of electrical position control means each having a controlling element and a controlled element whose position is determined by said controlling element during operation of each electrical position control means, and each electrical position control means including an electrically operable means for maintaining the controlling and controlled elements of that electrical position control means immovable with respect to each other when said electrically operable means is energized and for rendering the controlled element of that electrical position control means movable with respect to the controlling element thereof to have the position of the controlled element determined by the controlling element when said electrically operable means is unenergized, one of said electrical position control means forming part of said computer means and participating in the determination of said angular inclination of said flight plane during operation of said manually operable means, and the other of said electrical position control means forming part of said means for automatically maintaining said angle constant and participating in the maintaining of said angle constant; and manually operable switch means connected electrically with said pair of electrically operable means for energizing the electrically operable means of said other electrical position control means while said manually operable means is operated and while said means for automatically maintaining said angle constant is not operating and for energizing said electrically operable means of said one position control means and deenergizing said electrically operable means of said other position control means while said means for automatically maintaining said angle constant is operating.

8. In a control apparatus as recited in claim 1, a pair of electrical position control means each having a controlling element and a controlled element whose position is determined by said controlling element during operation of each electrical position control means, and each electrical position control means including an electrically operable means for maintaining the controlling and controlled elements of that electrical position control means immovable with respect to each other when said electrically operable means is energized and for rendering the controlled element of that electrical position control means movable with respect to the controlling element thereof to have the position of the controlled element determined by the controlling element when said electrical operable means is unenergized, one of said electrical position control means forming part of said computer means and participating in the determination of said angular inclination of said flight plane during operation of said manually operable means, and the other of said electrical position control means forming part of said means for automatically maintaining said angle constant and participating in the maintaining of said angle constant; and manually operable switch means connected electrically with said pair of electrically operable means for energizing the electrically operable means of said other electrical position control means while said manually operable means is operated and while said means for automatically maintaining said angle constant is not operating and for energizing said electrically operable means of said one position control means and deenergizing said electrically operable means of said other position control means while said means for automatically maintaining said angle constant is operating, said switch means being mounted on a manually engageable element of said manually operable means so as to be accessible at all times to the operator.

9. In a control apparatus for controlling a device such as an anti-aircraft gun or the like, in combination, an elongated manually operable lever forming part of a means for controlling lateral and elevational movement of the device to sight the same on a moving target; support means supporting said lever for turning movement about a predetermined point; a disc turnable about a predetermined axis passing through said point and formed with a radial slot through which said lever extends, the angular position of said slot with respect to said axis corresponding to the apparent direction of movement of the target and said lever when it moves along said slot without turning said disc changing the lateral and elevational speeds of the device while maintaining the ratio therebetween constant; a cam having a longitudinal axis and having an outer surface corresponding to angles of inclination of flight planes passing through the target and the device, said cam being turnable about its longitudinal axis in response to changes in elevation of the device; transmission means cooperating with said disc and cam for shifting the latter along its longitudinal axis in response to turning movement of said disc about its own axis so that the position of said cam along its longitudinal axis corresponds to said apparent angle of flight of the target, whereby when said lever is actuated said cam is set in a predetermined position corresponding to a predetermined flight plane; feeler means engaging the outer surface of said cam; and follower means actuated by said feeler means, said follower means being set into operation at the will of the operator for automatically actuating said transmission means to shift said cam along its longitudinal axis and to turn said disc about its own axis to positions corresponding to angles of apparent flight which together with the angular turning of said cam due to changes in elevation of the device provide a constant angle of inclination of the flight plane.

10. In an apparatus as recited in claim 9, said manually operable means of which said lever forms a part including a pair of elongated bar portions extending at right angles to each other and each formed with an elongated slot through which said lever extends, said pair of elongated bar portions respectively being fixed to an additional pair of elongated bar portions respectively extending at right angles to said first-mentioned bar portions, said additional bar portions being capable of moving only in longitudinal directions, respectively, and one of said additional bar portions controlling the elevational movement of the device in response to longitudinal shifting of said one additional bar portion, and the other of said additional bar portions when it moves longitudinally participating in the control of the lateral movement of the device.

11. In an apparatus as recited in claim 10, said manually operable means including a lateral control cam having a longitudinal axis and operatively connected to said other additional bar portion to be rotated about its longitudinal axis when said other additional bar portion shifts longitudinally; means responsive to the elevation of the device for shifting said lateral cam along its axis; and feeler means engaging the outer surface of said cam and responding to rotational and axial movement thereof for controlling the drive which moves the device laterally.

12. In an apparatus as recited in claim 10, the longitudinal shifting movement of said one additional bar portion determining directly the elevational angular movement speed of the device.

13. In a control apparatus for controlling a device such as an anti-aircraft gun, in combination, an electrical motor having a drive shaft extending through and beyond the same; optical means operatively connected with said drive shaft on one side of said motor to be operated thereby; a sleeve threadedly engaging said drive shaft at the opposite side of said motor and moving axially along said drive shaft during rotation thereof; a cam connected to said sleeve for axial movement therewith, said cam having an outer surface corresponding to the formula $$\cos t = \sin \delta \cos j$$

in which the angle $t$ indicates the angle of inclination of a flight plane passing through the target and the device, the angle $\delta$ indicating the apparent angle of the direction of flight of the target and the angle $j$ indicating the angle of elevation of the device, said cam being turnable about its axis in response to changes in elevation of the device and at a rate of turning movement which is constant with respect to the rate of change of elevation of the device; feeler means engaging the outer surface of said cam and shifting longitudinally in response to movement of said cam along or about its axis; follower means cooperating with said feeler means and connected electrically with said motor for actuating the latter to turn said shaft for changing the elevation of said cam in response to rotation thereof to a position which will maintain the angle $t$ constant; and manually operable means for manually controlling the lateral and elevational movement of the device, said drive shaft of said motor being operatively connected with said manually operable means for maintaining the ratio between the lateral and elevational movement of the device at a predetermined ratio corresponding to the position of said sleeve on said shaft.

14. In an apparatus as recited in claim 1 optical means through which the target is sighted, said optical means being operatively connected to said computer means and being driven thereby.

15. In an apparatus as recited in claim 14 said optical means including a reference mark visible in the viewing field of said optical means to be placed in a predetermined position with respect to the target sighted through said optical means, said computer means automatically regulating the position of said reference mark of said optical means.

16. In a control apparatus for controlling a device such as an anti-aircraft gun or the like, in combination, manually operable means and computer means cooperating with each other for controlling lateral and elevational movement of the device, said computer means automatically computing and setting into the apparatus, during operation of said manually operable means, the angular inclination of a flight plane passing through the target and the device; means operable at the will of the operator for applying to said manually operable means controls derived from said computer means for automatically maintaining constant, during manipulation of said manually operable means by the operator, the computed angular inclination of the flight plane which is in the apparatus; optical means, through which the target is sighted, having a turnable member turnable about a predetermined axis and provided with an indicator line visible to the operator and extending radially from said axis, said computer means turning said turnable member to turn said indicator line and the latter providing the apparent angle of flight of the target; and additional computer means cooperating with said first-mentioned computer means for computing from the angle of inclination of the flight plane and the apparent angle of flight of the target the lateral angle of the device in the flight plane.

17. In a control apparatus as recited in claim 16 and wherein when the target moves in the flight plane along an inclined path, said additional computer means comprises means for computing a correction angle compensating for movement of the target along an inclined path and means for transmitting the difference between the lateral angle of the device in the flight plane and said correction angle to said optical means.

18. In a control apparatus as recited in claim 16 and wherein when the device is situated in a position inclined to a horizontal plane, said additional computer means comprising means for computing a correction angle compensating for the inclination of the device with respect to a horizontal plane and means for transmitting the difference between the lateral angle of the device in the flight plane and said correction angle to said optical means.

(References on following page)

References Cited in the file of this patent

UNITED STATES PATENTS

| | | |
|---|---|---|
| 2,407,191 | Tear et al. | Sept. 3, 1946 |
| 2,407,665 | Holschuh et al. | Sept. 17, 1946 |
| 2,414,102 | Hull et al. | Jan. 14, 1947 |
| 2,429,467 | Ketay | Oct. 21, 1947 |
| 2,441,147 | Haubroe | May 11, 1948 |
| 2,539,501 | Weiss | Jan. 30, 1951 |
| 2,660,794 | Goertz et al. | Dec. 1, 1953 |
| 2,705,371 | Hammond | Apr. 5, 1955 |
| 2,762,123 | Schultz et al. | Sept. 11, 1956 |

FOREIGN PATENTS

| | | |
|---|---|---|
| 141,842 | Sweden | Aug. 25, 1953 |
| 63,611 | France | Apr. 20, 1955 |
| 514,976 | Italy | Feb. 11, 1955 |